(12) United States Patent
Nagarajan et al.

(10) Patent No.: US 7,630,098 B2
(45) Date of Patent: Dec. 8, 2009

(54) DYNAMIC ADJUSTMENT OF RASTER IMAGE PROCESSING PERFORMANCE BASED ON COLORS SEEN WITHIN SEVERAL RUNS

(75) Inventors: Ramesh Nagarajan, Pittsford, NY (US); Fritz Ebner, Berlin (DE); Zhenhuan Wen, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 647 days.

(21) Appl. No.: 11/519,068

(22) Filed: Sep. 12, 2006

(65) Prior Publication Data
US 2008/0062441 A1    Mar. 13, 2008

(51) Int. Cl.
*H04N 1/52* (2006.01)
(52) U.S. Cl. .................. 358/1.9; 358/3.23; 358/534
(58) Field of Classification Search ............ 358/1.9, 358/534–536, 3.06, 3.13, 3.2, 3.23; 345/596–602
See application file for complete search history.

(56) References Cited

U.S. PATENT DOCUMENTS

| 5,107,331 | A  | * | 4/1992  | Collell et al. .......... 358/536 |
| 5,473,446 | A  | * | 12/1995 | Perumal et al. ......... 358/534 |
| 6,236,465 | B1 | * | 5/2001  | Ota et al. ............. 358/534 |
| 6,360,007 | B1 |   | 3/2002  | Robinson et al. |
| 6,584,903 | B2 |   | 7/2003  | Jacobs |
| 6,731,407 | B1 | * | 5/2004  | Hayama ............... 358/3.2 |
| 6,766,051 | B2 |   | 7/2004  | Klassen et al. |
| 6,829,063 | B1 | * | 12/2004 | Allebach et al. ....... 358/534 |
| 2002/0085218 | A1 |   | 7/2002  | Degani et al. |
| 2006/0114497 | A1 |   | 6/2006  | Anderson et al. |

* cited by examiner

*Primary Examiner*—Scott A Rogers
(74) *Attorney, Agent, or Firm*—Pillsbury Winthrop Shaw Pittman LLP

(57) ABSTRACT

The presently disclosed embodiments are directed to methods and systems for improving the performance of an image processor color to color tile transformation by caching color tiles most recently calculated. A page of a print job is received. One or more color tiles based on colors found in a previous print job are pre-calculated and stored in a memory. A color present in the page is read. The color is compared to one or more pre-calculated color tiles. If the color does not match a pre-calculated color tile, a new color tile for the color is calculated, a pre-calculated color tile is removed from the memory, the new color tile is added to the memory, and the new color tile is used to print the page. If the color does match a pre-calculated color tile stored in the memory, the pre-calculated color tile is used to print the page.

20 Claims, 5 Drawing Sheets

DYNAMIC ADJUSTMENT OF RASTER IMAGE PROCESSING PERFORMANCE BASED ON COLORS SEEN WITHIN SEVERAL RUNS

BACKGROUND

1. Technical Field

The presently disclosed embodiments are directed to methods and systems for improving the performance of digital color printers. More specifically, color combinations seen during several job runs on a digital color printer are recorded and that information is used to pre-calculate blocks of halftone tiles ahead of time for faster performance.

2. Description of Related Art

When an image is prepared for rendering on an electronic device the image is represented as a set of pixels, or a two dimensional path describing an area to be marked. Each pixel describes a small portion of the image in terms of colorant pixel values for the colorants available on the rendering device. A path describes a shape in two dimensions, for example a letter from a font, a line of some thickness, or a rectangle. For example, typically a cathode ray tube (CRT) based computer display screen is comprised of red (R), green (G) and blue (B) phosphors. An image prepared for display on a CRT is described with a set of pixels. Each pixel describes the intensity with which the red, green and blue phosphors are to be illuminated on a small portion of the CRT.

A similar procedure is followed when an image is prepared for rendering on a printing device. Currently, at least some color printing devices apply cyan (C), magenta (M), yellow (Y), and sometimes black (K) colorants to a print medium, such as paper or velum, in order to render an image. Such printing devices are said to operate in a CMY or CMYK color space. When an image is prepared for rendering on a color-printing device, the image is represented as a set of pixels. Each pixel describes a small portion of the image by calling for an appropriate mixture of the available colorants. Typically, the pixel value for each colorant can range from 0 to 255. However, since many color-printing devices can either only place a dot or not place a dot in a particular point on the page, the pixel values must be reduced in bit depth to binary, that is, each pixel represents either a 0 or a 1.

Where color matching is required between two devices such as the CRT operating in RGB space and the printer operating in CMYK space, transforms based on calibration and measurement are required. In such a situation it is possible, for example, that the pure red RGB CRT pixel mentioned above, is mapped to a CMYK printer pixel calling for a less than fully saturated magenta component and a small amount of a cyan component. Furthermore, if one wants to print a copy of the original pure red RGB CRT pixel on a second printer it is quite likely that a second transform will have to be used. That transform may translate the original RGB CRT pixel to a second CMYK pixel. One reason two different CMYK printers may require different transforms is that different printers use different colorants. Each of the C, M, Y, and K images in a CMYK printer are called separations. For example, we can refer to the C separation in isolation of the other M, Y, and K separations if need be.

Print job attributes can also affect color transformations. For example, the mark resolution attribute provides the number of dots or pixels a printer can print in a given unit of length, such as an inch. Mark resolution is also typically given for the vertical and horizontal dimensions of a page. Another attribute that can affect color transformation is print quality mode. The print quality mode typically refers to different methods of transformation, yielding a different perceptual quality for the user. For example, one might prefer a 'punchy' output to a more perceptually accurate output. Print quality mode can also be low, medium, and high, for example. In this case a tradeoff is being made that the customer can control. For example, high quality may take longer to print and use more colorant material.

From the foregoing discussion it can be seen that an image prepared for rendering on a first device may need to be transformed if it is to be properly rendered on a second device. Such a transformation is an attempt to emulate the first or source device onto the second or destination device.

An image processor must be able to satisfactorily transform images, prepared for rendering on a staggeringly large number of source devices, for rendering on an equally large number of rendering devices. For example, a personal computer configured to operate as an image processor, through the use of, for example, a web browser, word processor, or desktop publishing software, must be able to accept images created or downloaded from almost anywhere, and render the images pleasingly on any image output terminal the user connects to the personal computer. For example, the image processor must be able to pleasingly display images on a computer screen and send commands to have images rendered pleasingly on any printer the user connects to the personal computer.

Similarly, document processors, printers, and copiers must transform images pleasingly and accurately. In digital printing, a customer or submitted job is converted into a printable job via a Raster Image Processor (RIP). This process converts customer jobs, represented in a Page Description Language, to complete images that are used to drive the color-printing device to mark the paper. An example of a Page Description Language is PostScript. Using this language, text is represented by an operator in the language called 'show', lines are represented using the 'stroke' operator, and rectangles and polygons are represented using the 'fill' operator. PostScript can also represent sampled images using variations of the 'image' operator.

One of the functions contained in the RIP is the conversion from the color space defined within the customer job to that of the color space of the printing device. The color accuracy requirements for digital printing can be very stringent. For example, in a large print job, comprising a corporate sales presentation, it is very important that colors in a company logo be reproduced accurately and consistently. Similarly, colors in a clothing catalog must match the colors on depicted garments.

Typically color transformations are carried out using look up tables. For example, an image prepared for rendering in a RGB color space of a computer monitor, is transformed into a CMYK color space of a printer, using a three-dimensional look up table. Each of the RGB parameters is used as an axis or index into the look up table. The RGB parameters are typically represented by 8-bit values for each of the R, G, and B components. Such a 24-bit RGB vector is capable of addressing over 16.77 million locations or describing over 16.77 million colors.

A further step in the RIP process converts the continuous tone (for example 8 bits per pixel) CMYK data to binary or lower bits per pixel (for example 1 bit per pixel) in order for the color-printing device to place colorant on the paper. This step in the RIP process is called halftoning. Halftoning either applies to input images in the source representation of the document (for example 'image' in PostScript Page description language) as well as other marking operators that are described as text, lines, or fills.

When halftoning CMYK data input as text, lines, or fills, the halftoning process covers the area to be marked with predefined patterns of 1s and 0s that represent the halftone screen. Usually, there is what is called halftone machinery, which performs the halftoning operations. The halftoning operations of the halftoning machinery perform two basic functions: image halftoning, and tile creation. Tile creation is the process of generating a rectangular image of 1s and 0s that represent the halftone at a particular color level. These tiles are then used to fill the areas to be marked by the text, line, or fill operations in the RIP.

There are two forms of halftone tile creation depending on the needs of the color-printing device. The simple form is called scalar halftoning, which treats each of the C, M, Y, and K separations independently. The more complex form is called vector halftoning, which treats the C, M, Y, and K separations as a vector of four colorants (C,M,Y,K) as a single unit. In both cases, halftone tiles are created to use in marking areas of text, lines, and fills. In the scalar case (assuming 8 bits per pixel data), each of the C, M, Y, and K color separations has 256 values. Each value has a corresponding halftone tile. When taken independently, there are 256 times four, or 1024, unique halftone tiles that must be created for scalar halftoning. In the vector halftoning case, because the CMYK separations are not independent, each combination of all colors has a unique halftone tile. In this case there are $256^4$=4,294,967,296 unique halftone tiles that must be created for vector halftoning.

An example halftone tile size is 128 by 128 pixels. Each tile consumes 2 kilobytes of memory. For scalar halftoning, the memory required to create and store 1024 tiles is 2 megabytes. For vector halftoning, the memory required to store all halftone tiles is 8,796,093,022,208 bytes, or roughly 8 terabytes. Modern computing devices can not store this many combinations. Because it takes time to create halftone tiles, ordinarily they are created and stored. In order to store frequently required halftone tiles, caching schemes are used. Caching tiles is the process of saving pre-computed tiles in an efficient data structure such that they are quickly retrieved when needed. One such efficient data structure that is commonly used is a hash table. A hash table takes as input a number, and uses it to look into a table for the corresponding value for the number. A hash table can be used to very efficiently find halftone tiles without having to store all the halftone tiles. Hash tables can store a small subset of commonly used tiles to significantly speed up the halftoning process.

SUMMARY

One embodiment is a method of speeding up the halftoning process is to pre-create a set of tiles that might be frequently used in a RIP process. Pre-created tiles can be stored on disk or in memory, and loaded quickly at the start of a print job or when the printer is turned on. In the vector halftoning case, where there are eight terabytes of tiles to choose from, only a very small fraction of the tiles can be created and stored at a given time, so the pre-created tiles need to be carefully chosen.

In many printing scenarios, a small subset of the available color combinations available are actually used. This is particularly true when dealing with typical office applications such as Microsoft® Word®, Microsoft® PowerPoint®, and Microsoft® Excel®. In this case, statistics measured from a small set of jobs can provide the data necessary to predict colors that will be frequently used in the future. These tiles can be pre-created, either once, or on an ongoing basis, and loaded before each job, thus reducing the time necessary to RIP documents.

Another embodiment is a method for improving the performance of image processor halftone machinery by pre-calculating and caching color tiles recently calculated. A page of a print job is received. One or more color tiles based on colors found in a previous print job are pre-calculated and stored in a memory of the image processor. A color present in the page is read. The color is compared to the one or more pre-calculated color tiles stored in a memory of the image processor. If the color does not match the a pre-calculated color tile stored in the memory, a new color tile for the color is calculated and the new color tile is added to the memory.

Another embodiment is method for improving the performance of an image processor color and print job attribute to color tile transformation by caching color tiles most recently calculated. A page of a print job is received. One or more color tiles are pre-calculated and stored in a memory of the image processor. A color and print job attribute present in the page are read. The color and print job attribute are compared to the one or more pre-calculated color tiles. If the color and print job attribute do not match the one or more pre-calculated color tiles stored in the memory, a new color tile is calculated for the color and print job attribute, an old pre-calculated color tile is removed from the memory, and the new color tile is added to the memory. If the color and print job attribute do match a matched color tile from the one or more pre-calculated color tiles stored in the memory, the matched color tile is used to print the page.

Another embodiment is a system for improving the performance of color to color tile transformation in color printing. The system includes a memory and a image processor. The image processor is used for transforming a color and print job attribute to a color tile. The image processor is connected to the memory. The image processor pre-calculates one or more pre-calculated color tiles based on colors and print job attributes found in a previous print job and stores them in the memory of the image processor. The image processor receives a page of a print job. The image processor reads a color and print job attribute present in the page and compares the color and print job attribute to one or more pre-calculated color tiles stored in the memory. If the color and print job attribute do not match the one or more pre-calculated color tiles stored in the memory, the image processor calculates a new color tile for the color and print job attribute, removes an old pre-calculated color tile from the memory, and adds the new color tile to the memory. If the color and print job attribute do match a matched color tile from the one or more pre-calculated color tiles stored in the memory, the image processor uses the matched color tile to print the page.

Other objects, features, and advantages of the present application will become apparent from the following detailed description, the accompanying drawings, and the appended claims.

Figure 1:
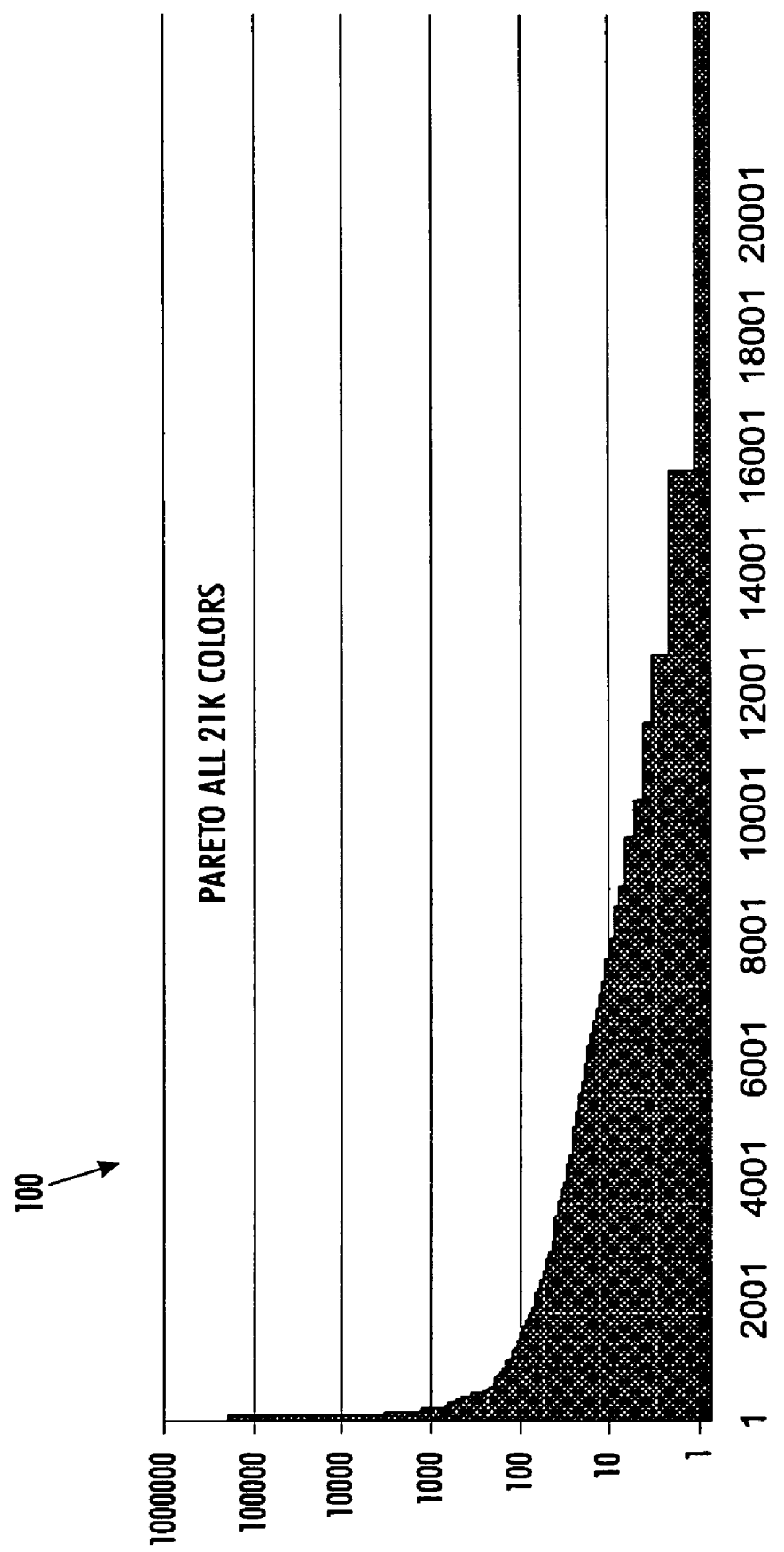
FIG. 1 is a pareto diagram of the top colors seen in an exemplary color printer test suite of print jobs, in accordance with an embodiment.

Before one or more embodiments are described in detail, one skilled in the art will appreciate that an embodiment is not limited in its application to the details of construction, the arrangements of components, and the arrangement of steps set forth in the following detailed description or illustrated in the drawings. An embodiment is capable of being practiced or being carried out in various ways. Also, it is to be understood that the phraseology and terminology used herein is for the purpose of description and should not be regarded as limiting.

DETAILED DESCRIPTION

The color printing performance of an RIP is affected by the number of calculations the RIP must perform or store. The number of calculations required for color printing is much larger than for black and white printing. There are two types of halftoning processes, scalar and vector. Scalar halftoning treats each of the CMYK separations independently. Vector halftoning treats a CMYK color as a single unit. There are 1024 combinations of scalar halftone color tiles (when the input is 8 bits per pixel). There are 4,294,967,296 combinations of vector halftone color tiles.

The halftone process uses a mathematically stored screen pattern or array, for example, which can represent a sampled sinusoidal two-dimensional pattern. In scalar halftoning, the process converts the original or continuous tone image into an image of black and white spots that "appears" to be a continuous tone image. In vector halftoning the process converts the original or continuous tone image into an image of one or more different colorant spots and white spots that "appears" to be a continuous tone image. A color tile is a screen pattern or array that is used in vector halftoning.

Pre-calculating all possible color tiles would improve RIP performance. However, pre-calculating all these possible color combinations is currently impractical. For example, as mentioned above, a 32-bit CMYK color space includes over 4,294 million color combinations or color tiles. Assuming each color tile requires two kilobytes of storage, more than eight terabytes of storage space is required to store all the possible color tiles for a 32-bit CMYK color space. Since the storage of all possible color combinations is currently impractical, current color printers that perform vector halftoning calculate color tiles in real-time and sacrifice RIP performance.

According to an embodiment, color combinations seen during several job runs on a digital color printer are recorded and that information is used to create pre-calculated color tiles ahead of time for faster RIP performance. This method is more advantageous than standard brute-force caching algorithms, because it allows knowledge of print job attributes and the actual colors present in the documents to be used in the calculation of color tiles. Print job attributes include, but are not limited to, mark resolution and print quality mode.

FIG. 1 is a pareto diagram 100 of the top colors seen in an exemplary color printer test suite of print jobs, in accordance with an embodiment. Diagram 100 shows the top 21,000 colors seen in the test suite. In diagram 100, only approximately 1,000 colors appear more than 100 times in the entire test suite. The frequency of the remaining colors falls off quickly. Diagram 100, therefore, suggests that pre-calculation and storage of a relatively small number of colors tiles can improve RIP performance.

Pre-calculation of a small number of color tiles is not without cost. If a memory storage or cache can store 2,500 color tiles and the calculation of a color tile can take between 0.1 and 0.2 milliseconds, approximately 250 milliseconds of processing time is required each time a color print job is started. However, up to 250 milliseconds of processing time is potentially saved for each page subsequently processed in a print job. Such savings reduce the time for vector halftoning close to the time needed for scalar halftoning for multiple page print jobs.

Figure 2:
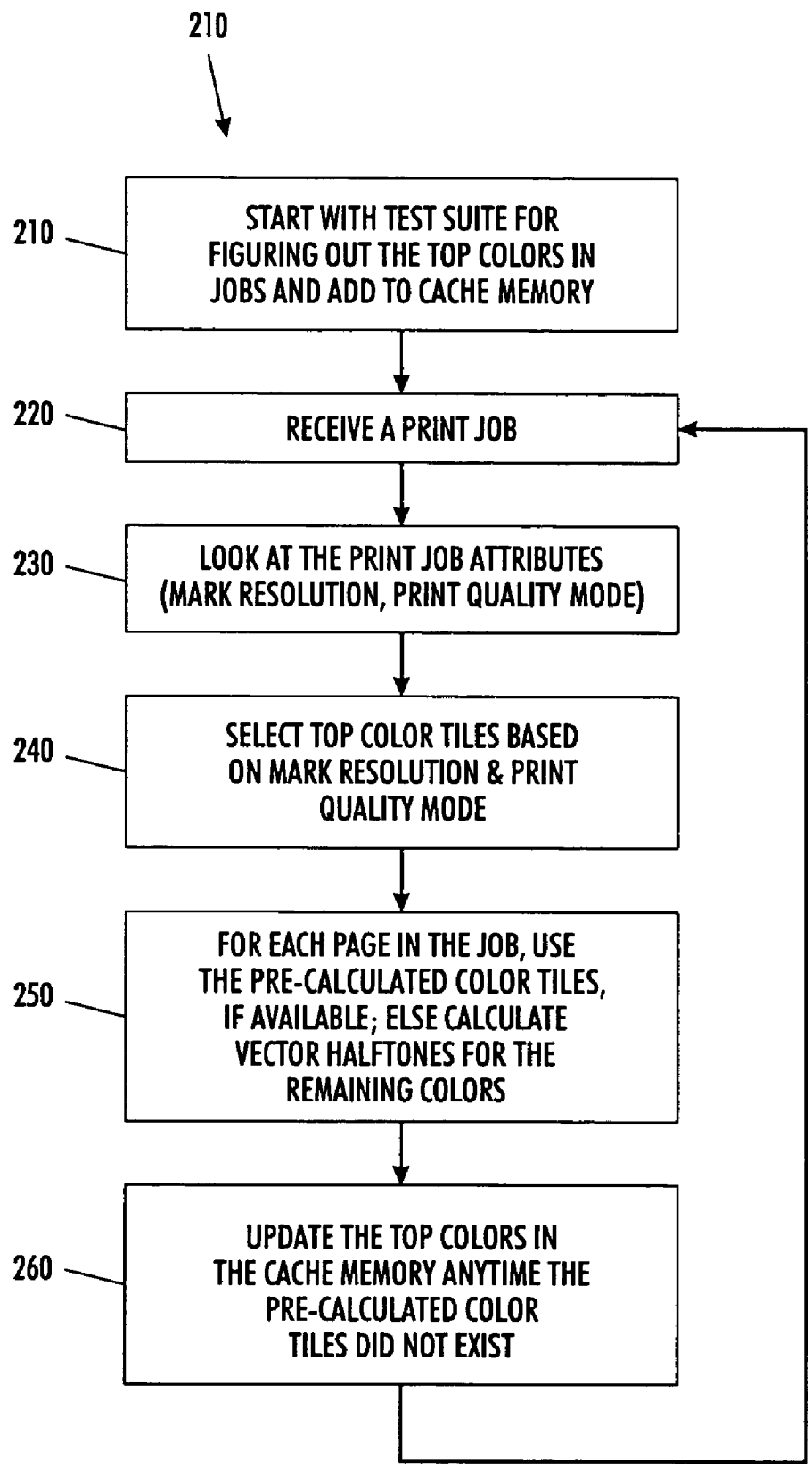
FIG. 2 is a flowchart showing a method for recording color combination information seen during several job runs on a digital color printer and using that information to pre-calculate color tiles ahead of time for faster RIP performance, in accordance with an embodiment.

FIG. 2 is a flowchart showing a method 200 for recording color combination information seen during several job runs on a digital color printer and using that information to pre-calculate color tiles ahead of time for faster RIP performance, in accordance with an embodiment.

In step 210 of method 200, a test suite of print jobs is run to figure out the top colors used. The top color tiles are added to a cache memory.

In step 220, a print job is received.

In step 230, the print job attributes are read. The print job attributes include, but are not limited to mark resolution and print quality mode.

In step 240, the top color tiles are selected based on mark resolution and print quality.

In step 250, pre-calculated color tiles are used for each page in the job if available. If a pre-calculated color tile is not available, it is calculated.

In step 260, the cache memory is updated anytime a new color tile is calculated.

Figure 3:
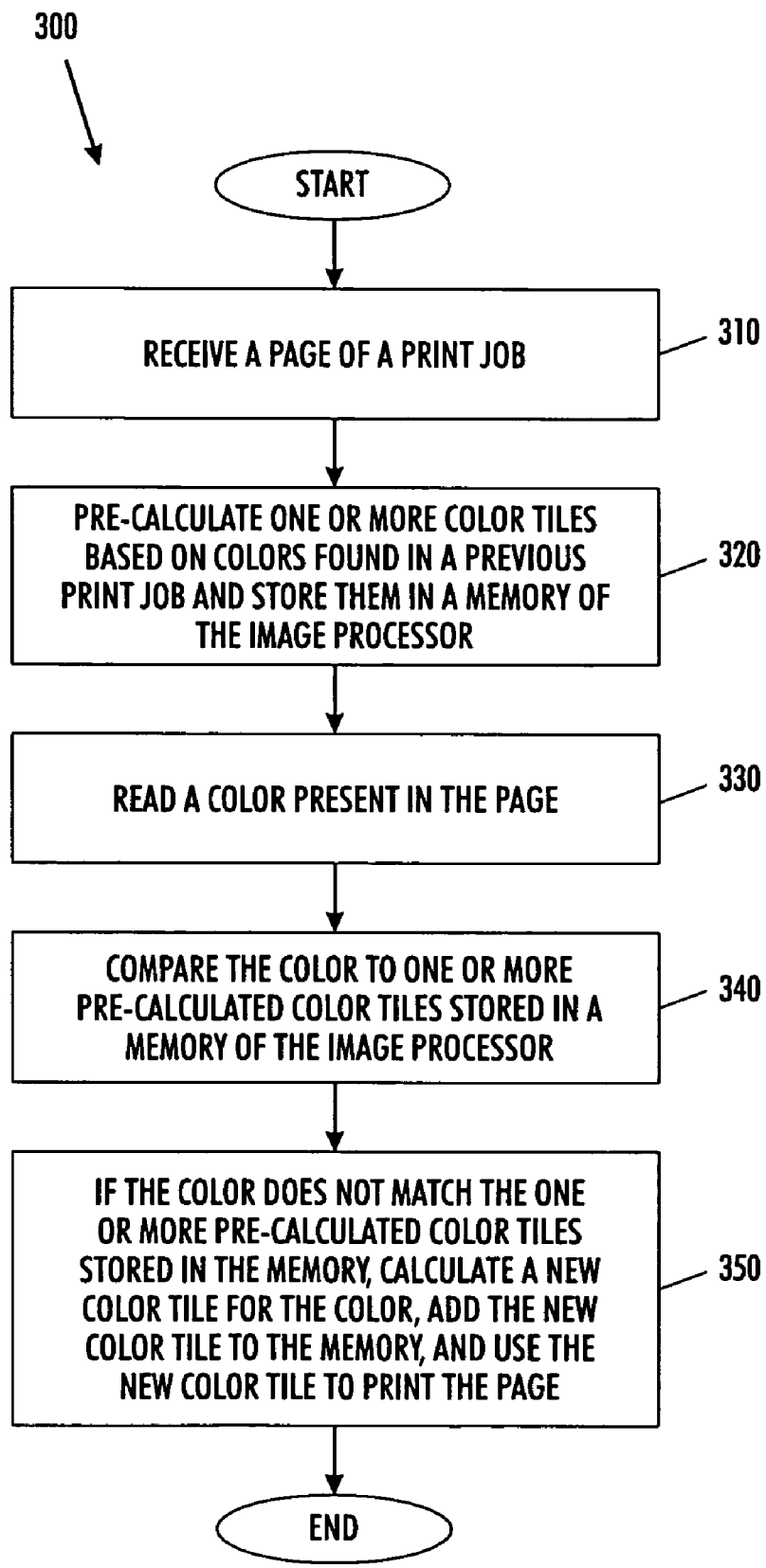
FIG. 3 is a flowchart showing a method for improving the performance of an image processor color to color tile transformation by caching color tiles most recently calculated, in accordance with an embodiment.

FIG. 3 is a flowchart showing a method 300 for improving the performance of an image processor color to color tile transformation by caching color tiles most recently calculated, in accordance with an embodiment.

In step 310 of method 300, a page of a print job is received. The page is described in a print description language, for example.

In step 320, one or more color tiles based on colors found in a previous print job are pre-calculated and stored in a memory of the image processor.

In step 330, a color and an attribute present in the page are read. The color can be, but is not limited to, a binary representation of a color or a color described in a page description language.

In step 340, the color and the attribute are compared to the one or more pre-calculated color tiles stored in a memory of the image processor. The image processor can be, but is not limited, to an RIP. A color tile is a block of pixels, for example. The memory can be, but is not limited, to a stack memory. The one or more pre-calculated color tiles are stored in the memory in the order in which they were calculated, for example. In another embodiment, the one or more pre-calculated color tiles stored in the memory in the order in which they were last used in a page. In another embodiment, the one or more pre-calculated color tiles stored in the memory based on frequency of color occurrence in one or more previous print jobs. In another embodiment, the one or more pre-calculated color tiles stored in the memory according to their frequency of used within a print job.

In step 350, if the color and the attribute do not match the one or more pre-calculated color tiles stored in the memory, a new color tile for the color and attribute is calculated and the new color tile is added to the memory. The new color tile is calculated using the color and the attribute as input variables.

In another embodiment of method 300, if the color and the attribute do not match the one or more colors tiles stored in the memory, a pre-calculated color tile is removed from the memory. The pre-calculated color tile removed from memory is the oldest of the one or more color tiles, for example. In another embodiment of method 300, the pre-calculated color tile removed from memory is the color tile that has not been used in a page longer than any other color tile of the one or more pre-calculated color tiles. In another embodiment of method 300, the pre-calculated color tile removed from memory is the color tile that was used less frequently in the print job than any other color tile of the one or more pre-calculated color tiles.

In another embodiment of method 300, if the color and the attribute do match a pre-calculated color tile stored in the memory, the pre-calculated color tile is used to print the page.

Figure 4:
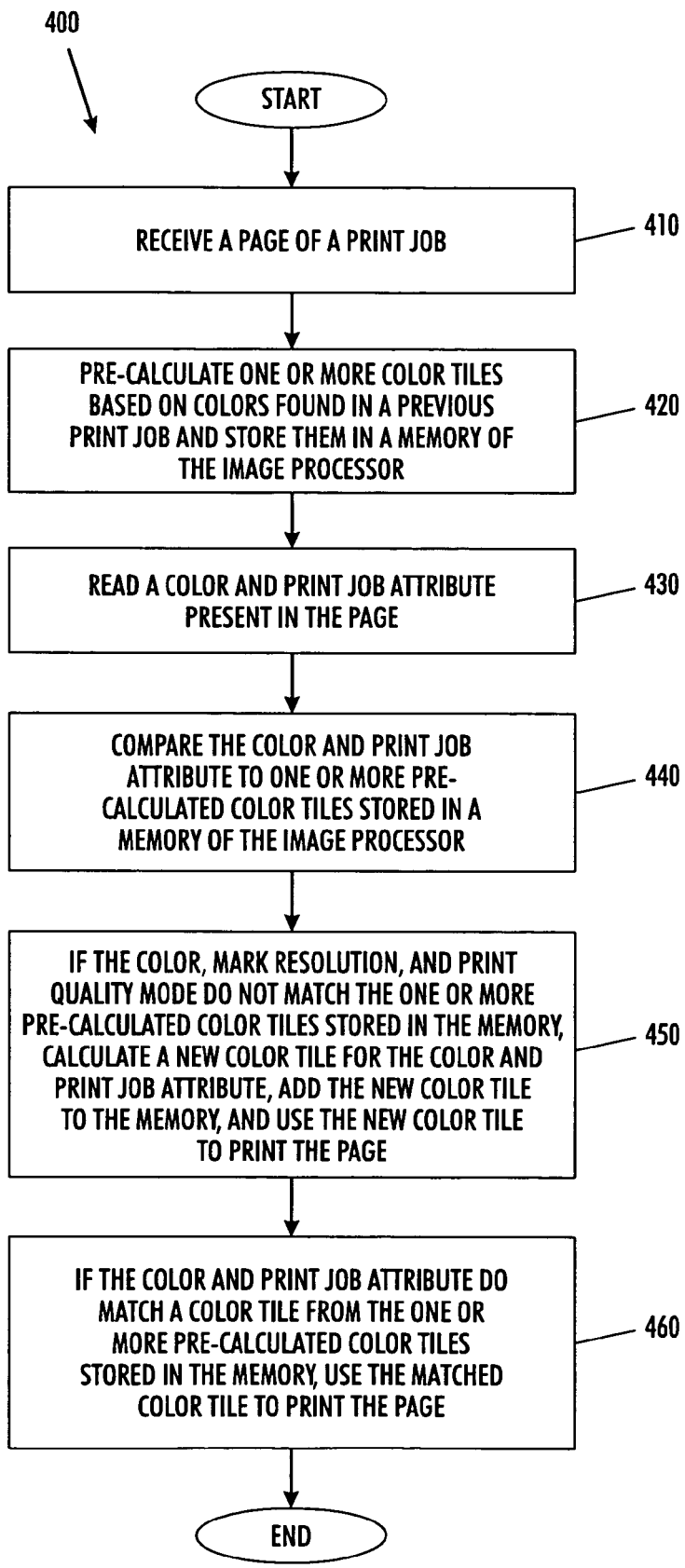
FIG. 4 is a flowchart showing a method for improving the performance of an image processor color and print job attribute to color tile transformation by caching color tiles most recently calculated, in accordance with an embodiment.

FIG. 4 is a flowchart showing a method 400 for improving the performance of an image processor color and print job attribute to color tile transformation by caching color tiles most recently calculated, in accordance with an embodiment.

In step 410 of method 400, a page of a print job is received.

In step 420, one or more pre-calculated color tiles are pre-calculated and stored them in a memory of the image processor. The one or more pre-calculated color tiles are pre-calculated based on colors and print job attributes found in one or more previous print jobs, for example.

In another embodiment of method 400, the one or more pre-calculated color tiles are pre-calculated based on color tile statistics of one or more previous print jobs including a set of representative documents. A user can specify when to restart the color tile statistics gathering, for example. The set of representative documents is a collection of office documents produced by applications including Microsoft® Word®, Microsoft® PowerPoint®, or Microsoft® Excel®, for example. In another embodiment of method 400, the set of representative documents is based on a specific user's or set of users' recently printed documents.

In step 430, a color and print job attribute present in the page are read. The print job attribute can be, but is not limited to, a mark resolution or a print quality mode.

In step 440, the color and print job attribute are compared to the one or more pre-calculated color tiles stored in the memory of the image processor. The image processor can be, but is not limited, to an RIP. The memory can be, but is not limited, to a stack memory.

In step 450, if the color and print job attribute do not match the one or more pre-calculated color tiles stored in the memory, a new color tile is calculated for the color and print job attribute, an old pre-calculated color tile is removed from the memory, and the new color tile is added to the memory.

In step 460, if the color and print job attribute do match a matched color tile from the one or more pre-calculated color tiles stored in the memory, the matched color tile is used to print the page.

In another embodiment of method 400, if the color and print job attribute do match a matched color tile from the one or more pre-calculated color tiles stored in the memory, the matched color tile is moved to the top of the memory. The memory is a first in first out (FIFO) device, for example.

Figure 5:
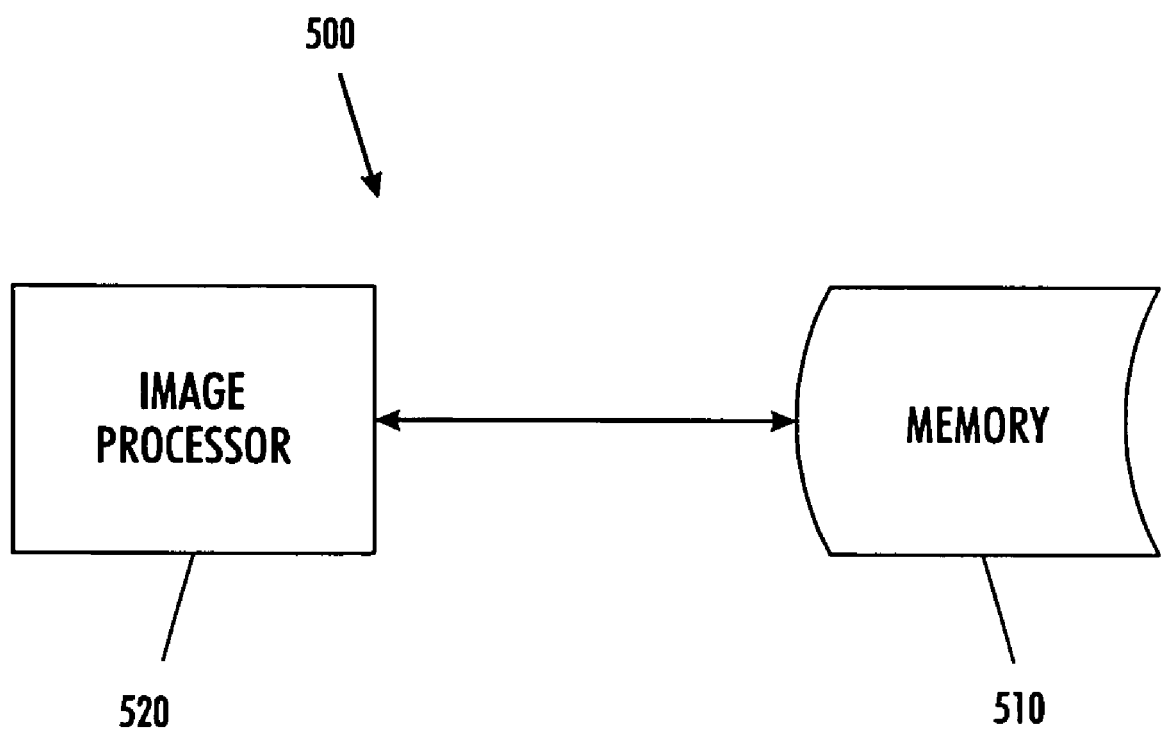
FIG. 5 is a schematic diagram showing a system for improving the performance of a color and print job attribute to color tile transformation in color printing, in accordance with an embodiment.

FIG. 5 is a schematic diagram showing a system 500 for improving the performance of a color and print job attribute to color tile transformation in color printing, in accordance with an embodiment. System 500 includes memory 510 and image processor 520. Image processor 520 is used for transforming a color to a color tile. Memory 510 can be, but is not limited to, a stack memory.

Image processor 520 is connected to memory 510. Image processor 520 can be, but is not limited to, an RIP. The image processor 520 pre-calculates the one or more pre-calculated color tiles based on colors and print job attributes found in a previous print job and stores them in Memory 510. Image processor 520 receives a page of a print job. Image processor 520 reads a color and print job attribute present in the page and compares the color and print job attribute to the one or more pre-calculated color tiles stored in memory 510. The print job attribute can be, but is not limited to, a mark resolution or a print quality mode. If the color and print job attribute do not match the one or more pre-calculated color tiles stored in memory 510, image processor 520 calculates a new color tile for the color and print job attribute, removes an old pre-calculated color tile from memory 510, and adds the new color tile to memory 510. If the color and print job attribute do match a matched color tile from the one or more pre-calculated color tiles stored in memory 510, image processor 520 uses the matched color tile to print the page.

In another embodiment, if the color and print job attribute do match a matched color tile from the one or more pre-calculated color tiles stored in memory 510, image processor 520 moves the matched color tile to the top of memory 510. Memory 510 is a FIFO device, for example.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The claims can encompass embodiments in hardware, software, or a combination thereof.

The word "printer" as used herein encompasses any apparatus, such as a digital copier, bookmaking machine, facsimile machine, multi-function machine, etc. which performs a print outputting function for any purpose.

What is claimed is:

1. A method for improving the performance of an image processor color to color tile transformation by caching color tiles, comprising:
   receiving a page of a print job;
   pre-calculating one or more pre-calculated color tiles based on colors found in a previous print job and storing them in a memory of the image processor;
   reading a color present in the page;
   comparing the color to the one or more pre-calculated color tiles; and
   if the color does not match the one or more pre-calculated color tiles, calculating a new color tile for the color, adding the new color tile to the memory, and using the new color tile to print the page.

2. The method of claim 1, wherein the page is described in a print description language.

3. The method of claim 1, wherein the one or more pre-calculated color tiles are stored in the memory in the order in which they were calculated.

4. The method of claim 1, wherein the one or more pre-calculated color tiles are stored in the memory in the order in which they were last used in a page.

5. The method of claim 1, wherein the one or more pre-calculated color tiles are stored in the memory based on frequency of color occurrence in one or more previous print jobs.

6. The method of claim 1, further comprising if the color does not match the one or more color tiles stored in the memory, removing a pre-calculated color tile from the memory.

7. The method of claim 6, wherein the pre-calculated color tile removed from the memory is the oldest of the one or more pre-calculated color tiles.

8. The method of claim 6, wherein the pre-calculated color tile removed from the memory has not been used in a page longer than any other color tile of the one or more pre-calculated color tiles.

9. The method of claim 6, wherein the pre-calculated color tile removed from the memory is used less frequently in the print job than any other color tile of the one or more pre-calculated color tiles.

10. The method of claim 1, further comprising if the color does match a matched pre-calculated color tile stored in the memory, using the matched pre-calculated color tile to print the page.

11. A method for improving the performance of an image processor color and print job attribute to color tile transformation by caching color tiles, comprising:

receiving a page of a print job;

pre-calculating one or more pre-calculated color tiles and storing them in a memory of the image processor;

reading a color and a print job attribute in the page;

comparing the color and print job attribute to the one or more pre-calculated color tiles;

if the color and the print job attribute do not match the one or more pre-calculated color tiles stored in the memory, calculating a new color tile for the color and the print job attribute, removing an old pre-calculated color tile from the memory, adding the new color tile to the memory, and using the new color tile to print the page; and if the color and the print job attribute do match a matched color tile from the one or more pre-calculated color tiles stored in the memory, using the matched color tile to print the page.

12. The method of claim 11, wherein the print job attributes are one or more of mark resolution and a print quality mode and the print job attribute is one of a mark resolution and a print quality mode.

13. The method of claim 11, further comprising if the color and the print job attribute do match a matched color tile from the one or more pre-calculated color tiles stored in the memory, moving the matched color tile to the top of the memory.

14. The method of claim 11, wherein the memory is a first in first out device.

15. The method of claim 11, wherein the one or more pre-calculated color tiles are pre-calculated based on colors and print job attributes found in one or more previous print jobs.

16. The method of claim 11, wherein the one or more pre-calculated color tiles are pre-calculated based on color tile statistics of one or more previous print jobs comprising a set of representative documents.

17. The method of claim 16, wherein the set of representative documents is a collection of office documents produced by applications comprising one or more of Microsoft® Word®, Microsoft® PowerPoint®, and Microsoft® Excel®.

18. The method of claim 16, wherein the set of representative documents is based on a specific user's or set of users' recently printed documents.

19. The method of claim 16, wherein a user can specify when to restart the color tile statistics gathering.

20. A system for improving the performance of a color and print job attribute to color tile transformation in color printing, comprising:

a memory; and an image processor for transforming a color and a print job attribute to a color tile, wherein the image processor is connected to the memory and wherein the image processor pre-calculates one or more pre-calculated color tiles based on colors and print job attributes found in a previous print job and stores them in the memory;

receives a page of a print job, reads the color and the print job attribute present in the page, compares the color and the print job attribute to the one or more pre-calculated color tiles, if the color and the print job attribute do not match the one or more pre-calculated color tiles stored in the memory, the image processor calculates a new color tile for the color and the print job attribute, removes an old pre-calculated color tile from the memory, adds the new color tile to the memory, and uses the new color tile to print the page, and if the color and the print job attribute do match a matched color tile from the one or more pre-calculated color tiles stored in the memory, the image processor uses the matched color tile to print the page.

* * * * *